United States Patent
Schulz et al.

[15] 3,696,142
[45] Oct. 3, 1972

[54] PRODUCTION OF CYCLOHEXENYL ACETATE

[72] Inventors: Gerhard Schulz, 5 Liebermannstrasse, 6700 Ludwigshafen; Erich Haarer, 36 Hammelstalstrasse, 6732 Bad Duerkheim; Guenther Matthias, 23 An der Froschlache, 6700 Ludwigshafen, all of Germany

[22] Filed: Nov. 9, 1970

[21] Appl. No.: 88,155

[30] Foreign Application Priority Data

Nov. 14, 1969 Germany..........P 19 57 299.7

[52] U.S. Cl. ........260/488 R, 260/585.5, 260/586 R, 260/617 R
[51] Int. Cl..............................................C07c 67/00

[58] Field of Search...................................260/488 R

[56] References Cited

UNITED STATES PATENTS

| 2,383,965 | 9/1945 | Gwynn | 260/488 |
| 2,461,017 | 2/1949 | Young | 260/488 |

*Primary Examiner*—Vivian Garner
*Attorney*—Johnston, Root, O'Keeffe, Keil, Thompson & Shurtleff

[57] ABSTRACT

Manufacture of cyclohexenyl acetate by reacting cyclohexanone with ketene in the presence of a phosphorus trihalide as catalyst. Cyclohexenyl acetate is an important intermediate in the manufacture of caprolactam.

4 Claims, No Drawings

PRODUCTION OF CYCLOHEXENYL ACETATE

This invention relates to a process for the manufacture of cyclohexenyl acetate by reacting cyclohexanone with ketene in the presence of a phosphorus trihalide.

Ber., Vol. 39 (1906), pp. 1594 ff. disclose that cyclohexanone may be reacted with acetic anhydride to form cyclohexenyl acetate. A similar reaction with ketene in place of the anhydride is also described, proposed catalysts being sulfoacetic acid (U.S. Pat. No. 2,461,016), carbonaceous materials such as wood, graphite and oil coke which have been treated with sulfurating and oxidizing agents (U.S. Pat. No. 2,511,423) and difluorophosphoric acid (German Pat. No. 1,121,605). None of these processes provides satisfactory yields or purity of the desired product. Side reactions involve the formation of tars due to polymerization of the ketene and condensation of the cyclohexanone with the elimination of water, for example when sulfuric acid is used. It is very difficult to manufacture the said catalysts so that they have constant efficiency. Their manufacture is uneconomical and, moreover, they may cause corrosion of the plant.

A drawback occuring in the use of difluorophosphoric acid is that the catalyst has to be neutralized, for example with sodium acetate, before the solution is distilled, and this also leads to the formation of deposits in the evaporators.

We have now found that cyclohexenyl acetate may be efficiently obtained by reacting cyclohexanone with ketene in the presence of a catalyst, provided that the catalyst used is a phosphorus trihalide.

The reaction may be represented by the following equations:

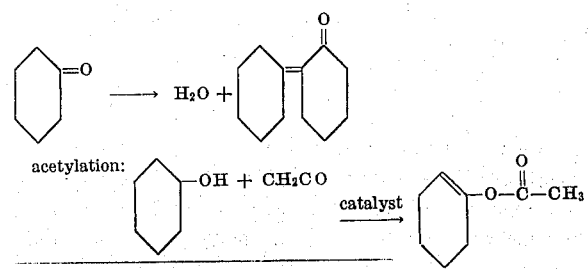

Compared with the previously known processes the process of the invention provides cyclohexenyl acetate in an economical manner and in better yield and purity. Tarry by-products do not occur to any significant degree. Such favorable results are surprising, since it would have been expected, in the light of the side reactions which occur in the presence of sulfuric acid, that phosphorus halides, being strong reactive acids and strong dehydrating agents, would assist the condensation of cyclohexanone according to the equation:

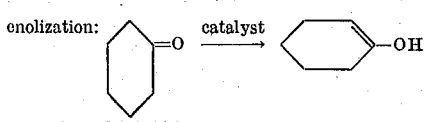

The catalysts used according to the present invention are superior to those previously known for this purpose in their reproducible efficiency, their economics and their reduced corrosiveness. It is not necessary to neutralize the catalyst before the product is isolated and, consequently, incrustations in the plant due to the catalyst or the neutralizing agent are avoided.

The ketene used in the process of the invention may be in a purified form or it may be in the form of crude ketene such as is obtained on dissociating acetic acid following the addition of ammonia and cooling to, say, 10°C. Such crude ketene may contain impurities such as methane, carbon dioxide, carbon monoxide, ethylene, propene, butadiene, butyne, hydrogen and, in particular, the vapors of water, acetic acid and acetic anhydride. For example, such a ketene may have the following composition: 80.5 percent by volume of ketene, 2.5 percent by volume of acetic acid/acetic anhydride vapors, 16.5 percent by volume of gaseous impurities (inert gas) and, possibly, 0.5 percent by weight of salts such as ammonium phosphate.

The reaction is carried out in the presence of ranging phosphorus trihalide, preferably phosphorus trichloride, usually in an amount rangingfrom 0.1 to 1, preferably from 0.2 to 0.5, percent by weight based on cyclohexanone. The starting materials are reacted continuously or batchwise, in general at a temperature of from 20° to 120°C and at a pressure of from 0.1 to 1.5 atmospheres, preferably at 1.2 atmospheres. If desired, organic solvents which are inert under the conditions of the reaction, such as ethers, for example diethyl ether or dipropyl ether; esters, for example ethyl acetate, and, in particular, carboxylic anhydrides, for example acetic anhydride, or mixture thereof may be used.

The reaction may be carried out as follows:

To a mixture of cyclohexanone, catalyst and, optionally, solvent there is added ketene over 0.5 to 10 hours with thorough mixing at the temperature of the reaction. The product is separated from the reaction mixture in the usual way, for example by fractional distillation.

The cyclohexenyl acetate produced by the process of the invention is a valuable intermediate in the manufacture of pesticides and, in particular, of caprolactam (European Chemical News Caprolactam Supplement, 1969, pp. 28–30) and thus of synthetic fibers and plastics.

In the following Examples the parts are by weight.

EXAMPLE

In a stirred tank equipped with a reflux condenser and gas inlet there are mixed 1,000 parts of cyclohexanone and 10 parts of phosphorus trichloride. There are then introduced, over 2 hours, 518 parts of crude ketene gas containing 461 parts of ketene, 21 parts of carbon monoxide, 16 parts of ethylene, 15 parts of methane, 5 parts of carbon dioxide and 3 parts of acetic anhydride. During this period the temperature rises to 100°C and falls again toward the end of the reaction. The ketene is absorbed virtually quantitatively. There are thus obtained 1,512 parts of reaction mixture, which on distillation gives the following fractions:

1. b.p. 47°–78°C/25 mm: 48 parts (including 32 parts of cyclohexanone);
2. b.p. 78°–83°C/25 mm: 1,370 parts of pure cyclohexenyl acetate ($n_{20}^D$ 1.4576);
3. b.p. 84°–155°C/25 mm: 38 parts;
4. residue: 46 parts.

The following values are thus obtained:
Conversion of cyclohexanone: 96.8 percent of theory;
yield of cyclohexenyl acetate:
   based on cyclohexanone introduced: 95.9 percent of theory;
   based on cyclohexanone converted: 99.1 percent of theory.

We claim:

1. A process for the manufacture of cyclohexenyl acetate which comprises reacting cyclohexanone with ketene at a temperature of about 20° to 120°C., at a pressure of about 0.1 to 1.5 atmospheres and in the presence of a catalyst consisting essentially of a phosphorus trihalide.

2. A process as claimed in claim 1 wherein said catalyst is phosphorus trichloride.

3. A process as claimed in claim 1 wherein said catalyst is present in an amount of about 0.1 to 1 percent by weight, based on the cyclohexanone.

4. A process as claimed in claim 1 wherein the reaction is carried out in an inert organic solvent.

* * * * *

PO-1050
(5/69)

UNITED STATES PATENT OFFICE
CERTIFICATE OF CORRECTION

Patent No. 3,696,142    Dated October 3, 1972

Inventor(s) Gerhard Schulz et al

It is certified that error appears in the above-identified patent and that said Letters Patent are hereby corrected as shown below:

Cover page, left hand column, insert -- [73] ASSIGNEE: Badische Anilin -& Soda-Fabrik Aktiengesellschaft, Ludwigshafen am Rhein, Germany --

Signed and sealed this 17th day of April 1973.

(SEAL)
Attest:

EDWARD M. FLETCHER, JR.　　　　　　　ROBERT GOTTSCHALK
Attesting Officer　　　　　　　　　　　Commissioner of Patents